United States Patent
Chaouch

(10) Patent No.: US 11,411,643 B1
(45) Date of Patent: Aug. 9, 2022

(54) OPTICAL SELF LOOPBACK FOR CO-PACKAGED OPTICS

(71) Applicant: Arista Networks, Inc., Santa Clara, CA (US)

(72) Inventor: Hacene Chaouch, Tucson, AZ (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/458,208

(22) Filed: Aug. 26, 2021

(51) Int. Cl.
*H04B 10/07* (2013.01)
*H04B 10/035* (2013.01)
*H04B 10/40* (2013.01)
*H04B 10/50* (2013.01)
*H04Q 11/00* (2006.01)

(52) U.S. Cl.
CPC ........... *H04B 10/07* (2013.01); *H04B 10/035* (2013.01); *H04B 10/40* (2013.01); *H04B 10/5057* (2013.01); *H04Q 11/0005* (2013.01)

(58) Field of Classification Search
CPC ...... H04B 10/07; H04B 10/035; H04B 10/40; H04B 10/5057; H04Q 11/0005
USPC .............................. 398/1–38, 9–38, 135–139
See application file for complete search history.

(56) References Cited

U.S. PATENT DOCUMENTS

| | | | | |
|---|---|---|---|---|
| 9,549,232 B1* | 1/2017 | Nagarajan | .......... | H04Q 11/0005 |
| 9,941,957 B2* | 4/2018 | Sahni | .................. | H04B 10/801 |
| 9,960,888 B2* | 5/2018 | Gloeckner | ............. | H04B 10/40 |
| 10,637,584 B1* | 4/2020 | Palmer | ................ | H04Q 11/0005 |
| 11,070,288 B1* | 7/2021 | Guzzon | .............. | H04B 10/0775 |
| 11,153,009 B1* | 10/2021 | Parker | ............. | H04B 10/07957 |
| 11,159,240 B1* | 10/2021 | Di Mola | ............... | H04L 1/0041 |
| 2006/0104592 A1* | 5/2006 | Jenkins | ................ | G02B 6/3596 385/140 |
| 2010/0119223 A1* | 5/2010 | Ferrari | .............. | H04B 10/0773 398/4 |
| 2011/0069950 A1* | 3/2011 | Ito | ........................ | H04B 10/035 398/9 |
| 2012/0051738 A1* | 3/2012 | Skirmont | ........... | H04B 10/0793 398/25 |
| 2012/0170931 A1* | 7/2012 | Evans | .................... | H04B 10/40 398/48 |
| 2014/0043050 A1* | 2/2014 | Stone | ................. | H04B 10/0779 324/750.01 |
| 2015/0222968 A1* | 8/2015 | Garcia | ................... | H04B 10/40 398/48 |
| 2017/0142503 A1* | 5/2017 | Takei | .................... | H04B 10/40 |

(Continued)

*Primary Examiner* — Dibson J Sanchez
(74) *Attorney, Agent, or Firm* — Fountainhead Law Group P.C.

(57) ABSTRACT

A photonic integrated circuit (PIC) includes an optical transmitter and an optical receiver. An optical loopback is coupled to the optical transmitter and to the optical receiver and is configurable to provide in a communications mode a transmitted optical signal from the optical transmitter to an optical output node and to provide a received optical signal on an optical input node to the optical receiver. The optical loopback is further configurable in a loopback testing mode to optically isolate the received optical signal on the optical input node from the optical receiver and to provide the transmitted optical signal from the optical transmitter to the optical receiver. A PIC including the optical loopback enables improved optical loopback testing of optical ports that will be present on network devices including co-packaged optics.

11 Claims, 6 Drawing Sheets

(56) References Cited

U.S. PATENT DOCUMENTS

| | | | |
|---|---|---|---|
| 2018/0039152 A1* | 2/2018 | Furuya | H04B 10/5161 |
| 2018/0041282 A1* | 2/2018 | Chen | H04B 10/035 |
| 2021/0044356 A1* | 2/2021 | Aboagye | G02B 6/423 |
| 2021/0392419 A1* | 12/2021 | Meister | G02B 6/423 |

* cited by examiner

US 11,411,643 B1

OPTICAL SELF LOOPBACK FOR CO-PACKAGED OPTICS

BACKGROUND

The amount of data being processed and communicated in data centers on the Internet and other computer networks is growing at an exponential rate. These data centers include large numbers of servers, routers, network switches and other components that process the data and communicate or transfer the data between components within the data center as well as to and from the data center. Due to the large amounts of data being processed, high bandwidth optical communications are primarily utilized for transferring data between components within a data center and to and from the data center. As the bandwidth of these components, such as the network switches, increases to meet the increased data traffic, the optical components and the interface of these optical components to electrical components within the switch becomes more complex and requires more power. The scalability of present network switches and other components to meet increased bandwidth demands is limited due to challenges in terms of the density of components required, costs, and required power levels.

To overcome challenges that increased bandwidths present with regard to scaling structures of existing network switches, electrical and optical components within the network switch are being integrated through what is commonly referred to as co-packaged optics (CPO). In CPO, the electrical circuitry and optical components are combined onto a common substrate, such as on the same printed circuit board assembly (PCBA). In CPO devices, the electrical signaling between electrical components and the optical components is reduced to intra-package distances, eliminating or reducing the need for retimers and reducing required power of the electrical signals and the need for high-speed traces on the PCBA. This reduced power requirement lowers the power required per bit and accordingly allows for increased numbers of data channels to be included in a given CPO device. Furthermore, CPO eliminates the need for discrete optical transceivers that are normally plugged into electrical ports on a faceplate of a conventional network switch, and an optical link is then coupled to each optical transceiver to optically connect the conventional network switch to other components. Instead, a CPO network switch includes a faceplate with optical connectors and not electrical connectors, with each of these optical connectors then being connected to an optical link to optically connect the switch to other components.

Although network switches including CPO have the advantages discussed above, the inclusion of a faceplate having optical ports on a network switch, or other device, presents various issues for implementing these types of devices. Optical ports are much more sensitive to damage than the electrical ports contained on the faceplates of conventional network switches. Optical ports are, for example, sensitive to dust and dirt that may get into the ports during manufacture of the switch and are generally more susceptible to damage from mechanical forces applied to the optical port, such as during insertion and removal of an optical link from the port.

During manufacture of a network switch as well as during installation of the network switch in a data center, various testing is typically performed to ensure the switch is operating properly. This testing includes loopback testing in which an external loopback cable or module is plugged into each port on the faceplate of the switch to test the functionality of transmitter and receiver components coupled to the port. In a conventional switch, the external loopback cable or module includes copper wires that couple the output of the transmitter to the input of the receiver to test the functionality of these components. Where the port is an optical port, an external optical loopback cable or module including an optical cable that couples the output of an optical transmitter to the input of an optical receiver must be utilized. As mentioned above, optical ports are susceptible to damage through contamination from dirt that may be present in the manufacturing environment in which the switch is being manufactured. Damage may also result from excessive mechanical forces that may result from an external optical loopback cable or module being plugged into and removed from each of the optical ports. Manually plugging and unplugging the loopback cables or modules is a time-consuming task and thus a person performing this task may end up damaging one or more optical ports in an attempt to complete the testing as quickly as possible.

Improved techniques are needed for performing loopback testing on optical ports of electronic devices such as network switches including CPO.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions.

DETAILED DESCRIPTION

Described herein are techniques for network devices including co-packaged optical transmitters and optical communication systems. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

In embodiments of the present disclosure, a network switch including co-packaged optics (CPO), which may be referred to as a CPO network switch in the present description, has a faceplate with a plurality of optical input/output (I/O) interfaces or ports instead of electrical ports as in a conventional network switch. The CPO include, for each optical port, a corresponding photonic integrated circuit (PIC) that is optically coupled to an optical connector of the port. Each PIC is electrically coupled through a printed circuit board assembly (PCBA) to a switching application specific integrated circuit (ASIC). An optical loopback is integrated into the PIC of each optical port to provide loopback functionality for the port without the need to physically connect an optical loopback cable or module to the port, as will be described in more detail below. Integrating the optical loopback functionality into the PIC associated with each optical port eliminates the need to physically couple an optical loopback cable or module to the optical port during testing of the network switch. As discussed above, these optical ports are susceptible to damage during manufacture and testing, such as through the accumulation of dirt within the port as well as through physical damage of the port from repeated connection and disconnection of optical loopback devices. In this way, embodiments of the present disclosure eliminate the need for the utilization of external optical loopback devices for network switches including CPO, and other network devices including CPO and optical ports.

Figure 1:
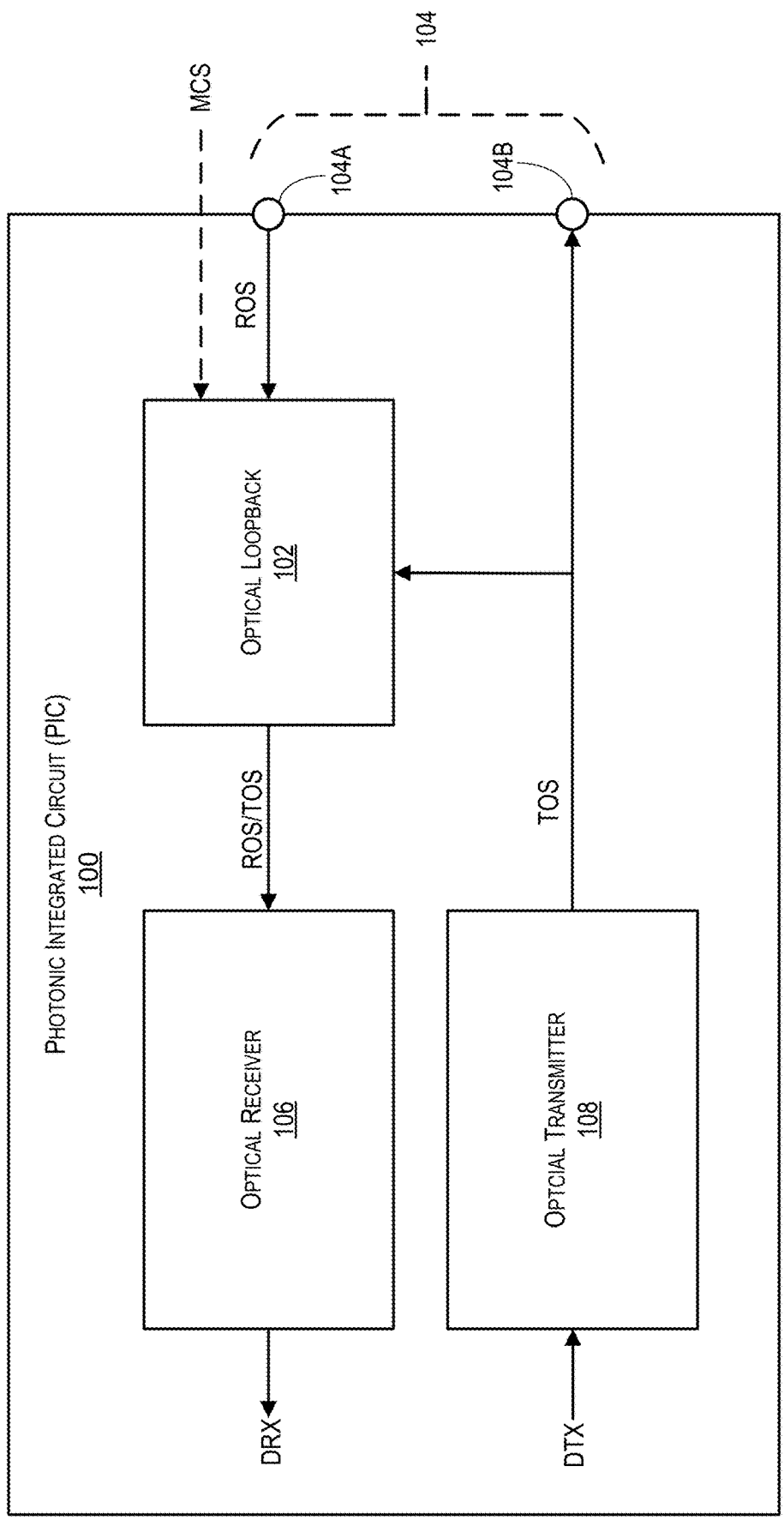
FIG. 1 is a functional block diagram of a photonic integrated circuit including an optical loopback according to one embodiment of the present disclosure.

FIG. 1 is a functional block diagram of a photonic integrated circuit (PIC) 100 including an optical loopback 102 according to one embodiment of the present disclosure. In operation, the optical loopback 102 provides loopback functionality for an optical port 104 without the need to couple an external optical loopback cable or module to the optical port, as will be explained in more detail below. In this way, the optical loopback 102 integrated into the PIC 100 allows loopback testing to be performed without an external optical loopback cable or module. This eliminates damage to the optical port 104 that may occur as a result of performing loopback testing by attaching the external optical loopback cable or module in a conventional manner. For example, a protective cover or insert (not shown in FIG. 1) would commonly be present in the optical port 104 prior to connecting the port to an optical link like an optical fiber. Such a protective cover prevents contaminants in the form of dust or other particulates as well as unwanted objects from entering and damaging the port and adversely affecting operation. The optical loopback 102 in the PIC 100 eliminates the need to remove such a protective cover for loopback testing via the optical port 104. The optical loopback 102 and other components of the PIC 100 may be formed from suitable materials and through suitable processes, as will be understood by those skilled in the art. For example, the PIC 100 may be formed from indium phosphide (InP) or may be formed as a silicon photonic (SiP) integrated circuit.

In the PIC 100, the optical loopback 102 is coupled between an input node 104A of the optical port 104 and an input of an optical receiver 106. The optical loopback 102 is further coupled to an output of an optical transmitter 108, with this output also coupled to an output node 104B of the optical port 104. The optical loopback 102 receives a mode control signal MCS from an external source (not shown) to place the optical loopback into one of two modes of operation: a standard communications mode and a loopback testing mode. In response to the MCS signal having a first value placing the optical loopback 102 into the standard communications mode, the optical port 104 functions in a conventional manner to receive optical signals ROS on the input node 104A and to provide or transmit optical signals TOS on the output node 104B. More specifically, in the standard communications mode the received optical signals ROS including modulated data are received on the input node 104A and the optical loopback 102 supplies these received optical signals to the input of the optical receiver 106. The optical receiver 106 then processes these received optical signals ROS, including demodulation and demultiplexing, to generate received electrical data signals DRX that are supplied to other components (not shown) coupled to the PIC 100. In the standard communications mode, the optical loopback 102 also blocks or optically isolates transmitted optical signals TOS on the output node 104B from the input of the optical receiver 106. The optical transmitter 108 receives an electrical transmission data signal DTX from components (not shown) and processes these signals, including modulation and multiplexing, to generate the transmitted optical signals TOS provided on the output node 104B of the optical port 104.

The optical loopback 102 is placed into and operates in the loopback testing mode in response to the MCS signal having a second value. In the loopback testing mode, the optical loopback 102 feeds back the transmitted optical signals TOS from the optical transmitter 108 on the output node 104B to the input of the optical receiver 106. Also in the loopback testing mode, the optical loopback 102 blocks or optically isolates the input node 104A from the input of the optical receiver 106. In this way, the optical loopback 102 enables loopback testing of the PIC 100 to be performed without the need to insert an optical loopback cable or module into the optical port. During optical loopback testing, the transmitted optical signals TOS generated by the optical transmitter 108 are fed back through the optical loopback 102 to the input of the optical receiver 106. The optical receiver 106 generates electrical data signals DRX corresponding to transmitted optical signals TOS to thereby enable testing of the proper operation of the optical receiver 106 and optical transmitter 108 associated with the optical port 104.

By utilizing the PIC 100, all that is needed to perform optical loopback testing of the PIC 100 is for an external circuit (not shown) to supply the mode control signal MCS having the second value to the optical loopback 102. No external optical loopback cable or module need be plugged into and removed from the optical port 104 to perform this testing. Thus, the likelihood of damage to the optical port 104 during the plugging and unplugging of an external optical loopback cable or module is eliminated. This elimination of the need for external loopback cables or modules also greatly reduces the time needed to perform optical loopback testing of a network switch or other device including co-packaged optics (CPO) containing multiple ones of the PICs 100. In addition, the internal optical loopback 102 also enables loopback testing of the PIC 100 to be performed even when an optical fiber or other optical link is inserted into the optical port. In this way, optical loopback testing may be utilized, for example, to determine whether an optical cable coupled between a given optical port 104 and another optical port is damaged or whether the optical receiver 106 and optical transmitter 108 associated with the given optical port are not operating properly.

In the present description, the term node is utilized to simplify the descriptions of the structures illustrated and being described. The term node corresponds to a suitable optical structure or structures in the overall optical circuit being described. Thus, a node may correspond to an optical waveguide, for example, along with possibly other associated optical structures for the optical circuit being described, as will be understood by those skilled in the art.

Figure 2:
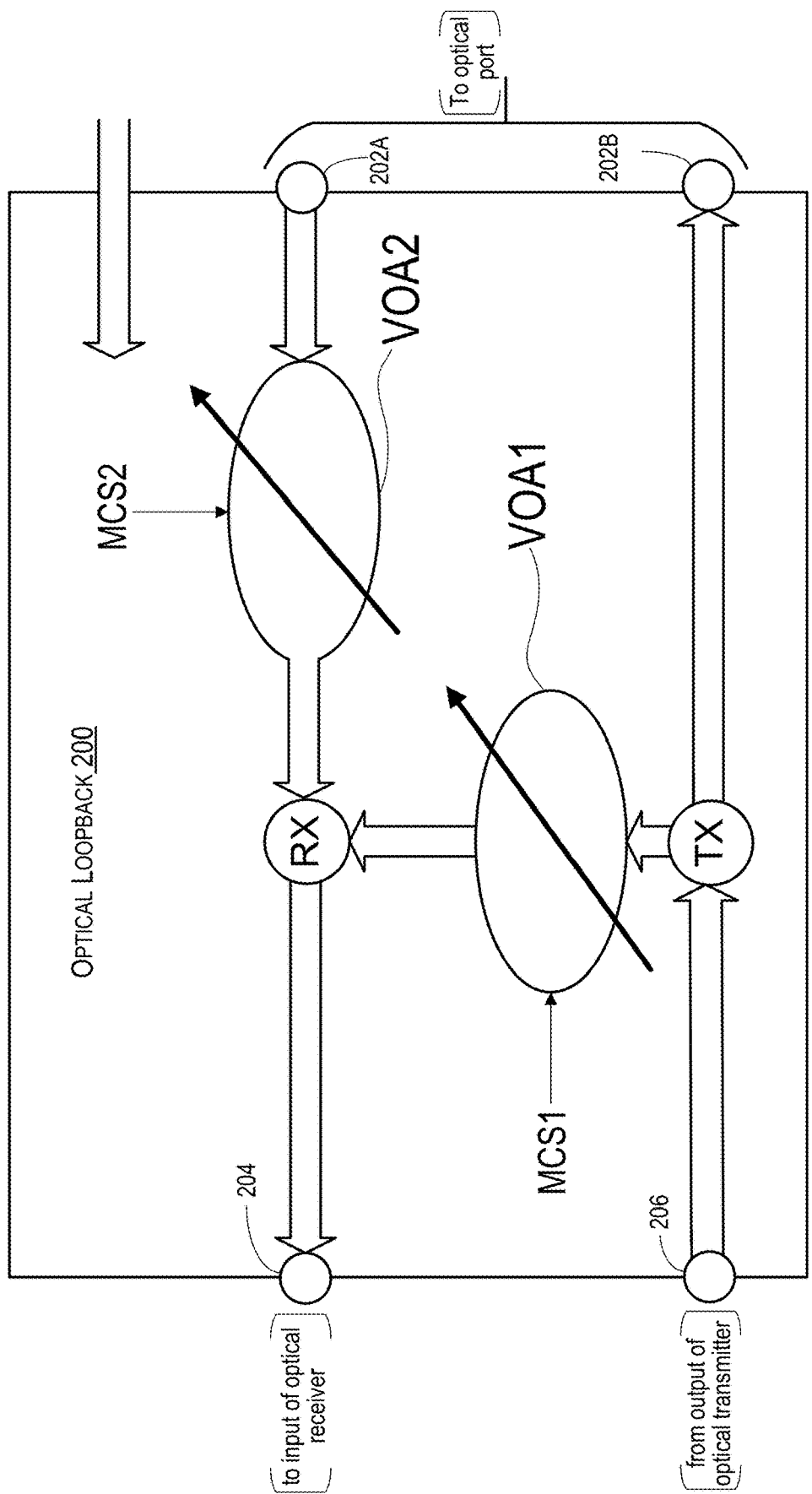
FIG. 2 is a more detailed functional block diagram of the optical loopback of FIG. 1 according to one embodiment of the present disclosure.

FIG. 2 is a more detailed functional block diagram of an optical loopback 200 according to one embodiment of the present disclosure. The optical loopback 200 is one possible embodiment of the optical loopback 100 of FIG. 1. The optical loopback 200 includes an optical input node 202A and an optical output node 202B configured to be coupled to the input and output nodes, respectively, of an optical port (not shown). A first variable optical attenuator VOA1 is coupled between a transmission node TX and a receiving node RX and a second variable optical attenuator VOA2 is coupled between the optical input node 202A and the receiving node RX. Each variable optical attenuator VOA1, VOA2 operates in one of two modes. In a first mode, the variable optical attenuators VOA1, VOA2 transmit an optical signal received on an input to an output. In a second mode, the variable optical attenuators VOA1, VOA2 block the optical signal from being transmitted from the input to the output. The receiving node RX is further coupled to an output node 204 that is configured to be coupled to an input of an optical receiver (not shown). An input node 206 that is configured to be coupled to an optical transmitter (not shown) is coupled to the transmission node TX, which is further coupled to the optical output node 202B of the optical port 202.

In operation, the mode control signals MCS1, MCS2, which are electrical signals, are applied to the variable optical attenuators VOA1, VOA2, respectively, to control the mode of operation of the optical loopback 200. The optical loopback 200 operates in a loopback testing mode in response to the mode control signal MCS1 having a first value to place VOA1 in the first mode and the mode control signal MCS2 having a second value to place VOA2 in the second mode. When the mode control signal MCS2 has the second value, the variable optical attenuator VOA2 blocks optical signals on the optical input node 202A from propagating through the attenuator to the receiving node RX. At the same time, the mode control signal MCS1 having the first value causes the variable optical attenuator VOA1 to pass or allow a predetermined portion of the optical signal on the transmission node TX to pass through the attenuator to the receiving node RX. Thus, for example, the attenuator VOA1 operating in the first mode may couple 30% of the power of the optical signal on the TX node to the RX node.

In this way the optical loopback 200 enables loopback testing functionality to be performed on an optical transmitter (not shown) coupled to the input node 206 and an optical receiver (not shown) coupled to the output node 204. More specifically, transmitted optical signals from the optical transmitter propagate through the input node 206 and transmission node TX to the variable optical attenuator VOA1. These transmitted optical signals then propagate through the variable optical attenuator VOA1 to the receiving node RX and then through the receiving node and output node 204 to the optical receiver. In this way, optical loopback testing allows the proper operation of the optical transmitter and optical receiver to be verified by determining whether the optical transmitter transmits the proper optical signals, and the optical receiver receives these transmitted optical signals as fed back to the optical receiver through the variable optical attenuator VOA1.

When the mode control signal MCS1 has the second value, placing VOA1 in the second mode, and the mode control signal MCS2 has the first value, placing VOA2 in the first mode, the optical loopback 200 operates in a standard communications mode. In the standard communications node, the variable optical attenuator VOA1 operates, in response to the mode control signal MCS1 having the second value, to block optical signals on the transmission node TX from propagating through the attenuator to the receiving node RX. The mode control signal MCS2 having the first value causes the variable optical attenuator VOA2 to pass or allow optical signals on the optical input node 202A to pass through the attenuator to the receiving node RX. Thus, in the standard communications mode the optical loopback 200 allows an optical receiver coupled to the output node 204 and an optical transmitter coupled to the input node 206 to receive and transmit optical signals through an optical port coupled to the optical input node 202A and optical output node 202B. Optical signals received on the optical input node 202A propagate through the optical input node and through the second variable attenuator VOA2 to the receiving node RX. Optical signals from an optical transmitter are applied on the input node 206 and propagate through the input node and the transmission node TX to the optical output node 202B for transmission through the corresponding optical port. In the standard communications mode, the first variable optical attenuator VOA1 blocks optical signals on the transmission node TX from propagating to the receiving node RX.

In one embodiment, each of the variable optical attenuators VOA1, VOA2 is a 40 dB attenuator. In this embodiment, when the corresponding mode control signal MCS1, MCS2 turns ON or activates the corresponding attenuator VOA1, VOA2, the attenuator provides 40 dB attenuation between an optical signal input to the attenuator and an optical signal output by the attenuator. Thus, when activated, the variable optical attenuator VOA1 attenuates optical signals received on the TX node by 40 dB and outputs these attenuated optical signals on the RX node, which effectively "blocks" or "optically isolates" the optical signals on the TX node from being provided on the RX node. In contrast, when the variable optical attenuator VOA1 is turned OFF or deactivated, the optical signals on the TX node propagate through the attenuator without being attenuated and are supplied on the RX node. The variable optical attenuator VOA2 operates in the same way in relation to either blocking or providing 40 dB attenuation of optical signals received on the optical input node 202A.

In this way, each of the variable optical attenuators VOA1, VOA2 may be viewed as either optically isolating one optical node from another or optically coupling one optical node to another. For example, where the variable optical attenuator VOA1 is activated and attenuates the optical signal on TX node the attenuator may be viewed as optically isolating the TX node from the RX node. Conversely, where the variable optical attenuator VOA1 is deactivated and does not attenuate the optical signal on TX node the attenuator may be viewed as optically coupling the TX node to the RX node. The same is true for the variable optical attenuator VOA2 in relation to the optical input node 202A and the RX node coupled to an input of an optical receiver. One skilled in the art will understand suitable structures for forming each of the variable optical attenuators VOA1, VOA2.

Figure 3:
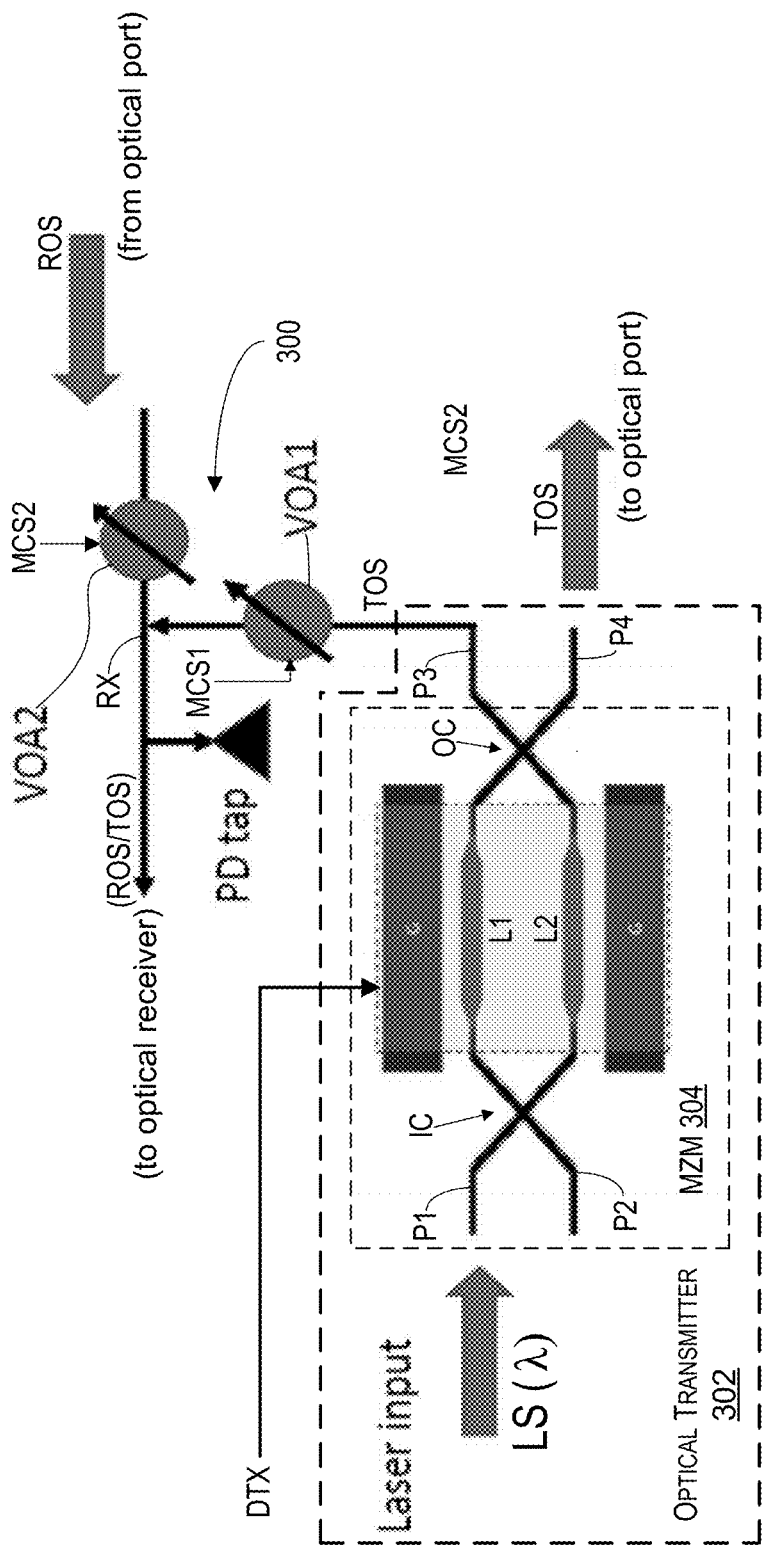
FIG. 3 is a block diagram of an optical loopback and an optical transmitter including a Mach-Zehnder modulator according to another embodiment of the present disclosure.

FIG. 3 is a block diagram of an optical loopback 300 and an optical transmitter 302 including a Mach-Zehnder modulator (MZM) 304 according to another embodiment of the present disclosure. In this embodiment, the optical loopback 300 includes a first optical attenuator VOA1 and second optical attenuator VOA2 that receive mode control signals MCS1 and MCS2, respectively, and operate as previously described for the optical loopback 200 of FIG. 2. In addition, the optical loopback 300 also includes a photodetector (PD) tap coupled to an RX node on which either a received optical signal ROS from a corresponding optical port (not shown) is received or a transmitted optical signal TOS from the MZM 304 is supplied during the loopback testing mode of operation. The PD tap generates a signal in response to the either ROS or TOS optical signal on the RX node to enable circuitry (not shown) coupled to the PD tap to detect the power of the optical signal ROS/TOS on the RX node that is being supplied to an optical receiver (not shown) coupled to this node.

In the embodiment of FIG. 3, the optical transmitter 302 includes the MZM 304 that receives electrical transmission data signal DTX and utilizes these signals to modulate an optical signal received from a laser (not shown). The theory and operation of Mach-Zehnder modulators will be understood by those skilled in the art and thus will not be described in detail in the present description. Embodiments of the present disclosure are not limited to utilizing Mach-Zehnder modulators. The advantage, however, of utilizing such a Mach-Zehnder modulator in embodiments of the present disclosure is the existence of a complementary output that is inherently part of such a modulator. This complementary output, which is presently not used, may be utilized to feed back a transmitted optical signal TOS to the optical loopback 300 for utilization in optical loopback testing, as will now be described in more detail.

The MZM 304 is a four-port device and includes two optical input ports P1, P2 and two optical output ports P3, P4. A laser signal LS is supplied to the input port P1 of the MZM 304, where a laser contained in the optical transmitter 302 generates this laser signal having a given wavelength λ. No input signal is applied to the input port P2. The laser signal LS propagates into the input port P1 and an input coupler IC of the MZM 304 couples this signal into two optical waveguides or optical paths L1 and L2. The optical paths L1, L2 are formed from a material having a characteristic, such as a refractive index n, which may be varied through application of the electrical transmission data signal DTX to a conductive plate G proximate the optical path. In this way, the transmission data signal DTX changes the refractive index n of the optical paths L1, L2 so that the refractive indices are different in the two optical paths, resulting in different phase velocities of the laser signals propagating through the two optical paths. The frequency of the transmission data signal DTX is much less than the frequency of the laser signal LS in the MZM 304. For example, the frequency of the data signal DTX is in Gigahertz (GHz) while the frequency of the laser signal LS is in Terahertz (THz). An output coupler OC of the MZM 304 receives the two laser signals of different phase velocities from the optical paths L1, L2, with these different phase velocities resulting in a phase shift between the two laser signals. The output coupler OC couples portions of each of the phase shifted laser signals from the optical paths L1, L2 into an optical output port P3 and an optical output port P4. The combined optical signal coupled into each of the optical output ports P3, P4 is a modulated signal having a characteristic, such as amplitude, which is varied or modulated based on the value of the transmission data signal DTX. This combined optical signal provided to each of the optical output ports P3, P4 is designated as the transmitted optical signal TOS in FIG. 3.

Typically, the transmitted optical signal TOS from only one of optical output ports P3, P4 is utilized. In the example of FIG. 3, the optical output port P4 corresponds to the conventional output from the MZM 304, with this output then being coupled to an output node (not shown) of an optical port to thereby provide the transmitted optical signal TOS from the optical port. The optical output port P3 is typically left unconnected in conventional applications of the MZM 304. As illustrated in the embodiment of FIG. 3, however, in embodiments of the present disclosure the optical output port P3 of the MZM 304 is coupled to the input of the variable optical attenuator VOA1. In this way, the modulated optical signal TOS provided at the optical output port P3 of the MZM 304 may be fed back through the variable optical attenuator VOA1 during loopback testing of the optical transmitter 302 and optical receiver (not shown) coupled to the optical loopback 300.

The optical loopback 300 operates in either a loopback testing mode or standard communications mode of operation in the same way as previously described for the optical loopback 200 of FIG. 2. Thus, the detailed operation of the optical loopback 300 in each of these modes of operation will not again be described in detail. Briefly, in the standard communications mode of operation the mode control signals MCS1, MCS2 are applied to the variable optical attenuators VOA1, VOA2 to turn ON the variable optical attenuator VOA1 and to turn OFF the variable optical attenuator VOA2. As a result, the variable optical attenuator VOA1 blocks the transmitted optical signal TOS from the optical output port P3 of the MZM 304 from being applied to the receive node RX. The transmitted optical signal TOS from the optical output port P4 of the MZM 304 is provided to an output node (not shown) of a corresponding optical port for transmission from that optical port. In this mode of operation, the variable optical attenuator VOA2 allows the received optical signals ROS from an input node (not shown) of a corresponding optical port to propagate through this variable optical attenuator to the receive node RX and through this node to an input of an optical receiver. Thus, in the standard communications mode transmitted optical signals TOS from the optical transmitter 302 are supplied through the optical output port P4 of the MZM 304 and are transmitted through the corresponding optical port while received optical signals ROS from the optical port are provided through the variable optical attenuator VOA2 to the optical receiver.

In the optical loopback testing mode of operation, the mode control signals MCS1, MCS2 are applied to the variable optical attenuators VOA1, VOA2 to turn OFF the variable optical attenuator VOA1 and to turn ON the variable optical attenuator VOA2. As a result, the variable optical attenuator VOA1 allows the transmitted optical signal TOS from the optical output port P3 of the MZM 304 to be applied to the receive node RX. In this way the transmitted optical signal TOS from the optical transmitter 302 is fed back through the variable optical attenuator VOA1 to the optical receiver to provide optical loopback testing of the optical transmitter and optical receiver. The variable optical attenuator VOA2 is turned ON to block any received optical signals ROS from the input node of the corresponding optical port from propagating to the receive node RX so that optical loopback testing may be performed. During the optical loopback testing mode, the transmitted optical signals TOS from the optical transmitter 302 are also supplied through the optical output port P4 of the MZM 304 to the output node of the corresponding optical port. Thus, any device coupled to this optical port, and which receives these transmitted optical signals TOS, would be configured to ignore the transmitted optical signals during the loopback testing mode of operation.

Figure 4:
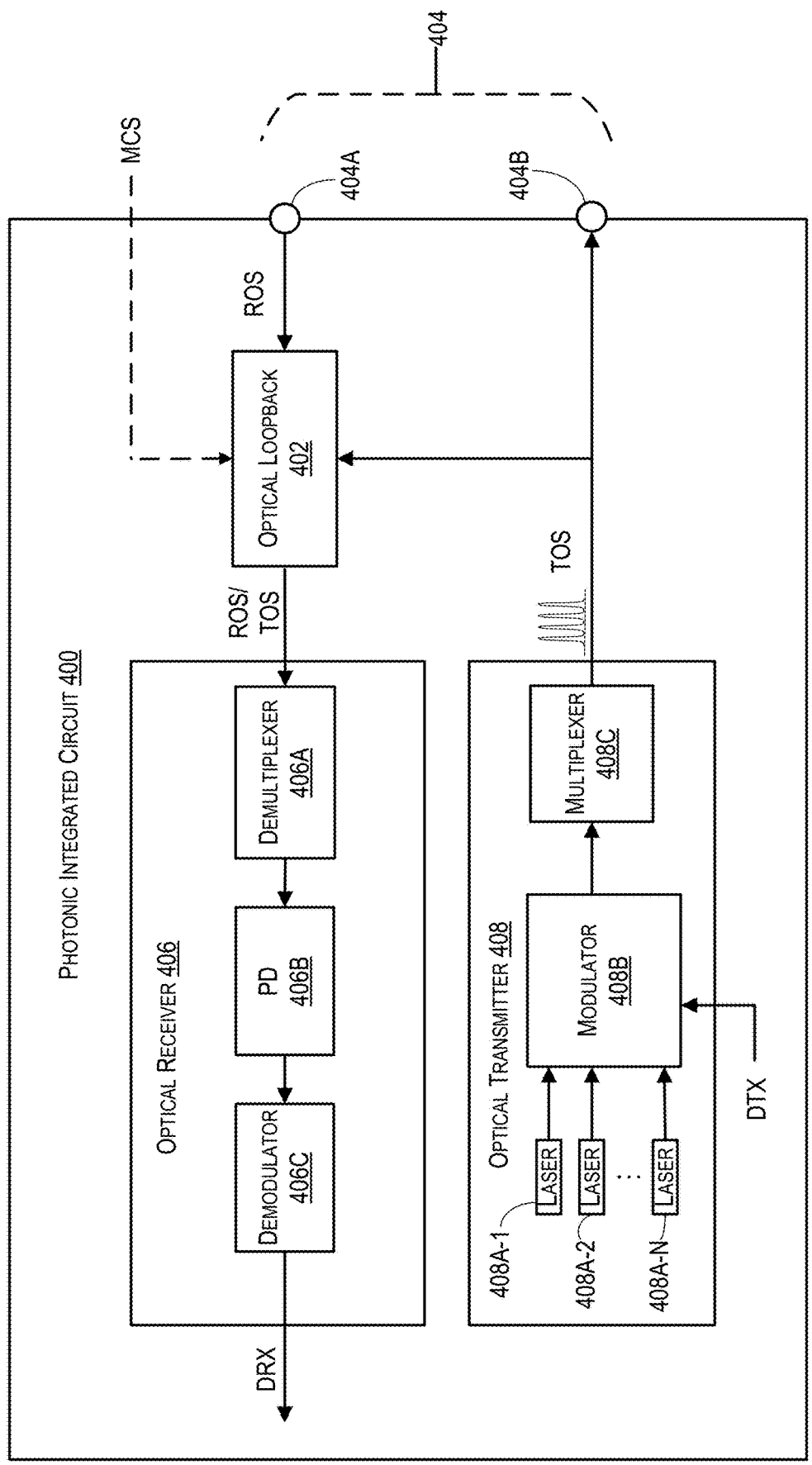
FIG. 4 is a more detailed functional block diagram of one embodiment of the photonic integrated circuit of FIG. 1.

FIG. 4 is a functional block diagram of a photonic integrated circuit (PIC) 400 according to one embodiment of the present disclosure. The PIC 400 corresponds to one embodiment of the PIC 100 of FIG. 1. The PIC 400 includes an optical loopback 402 coupled to an optical port 404, an optical receiver 406 and an optical transmitter 408. The optical loopback 402 receives a mode control signal MCS and operates in response to the mode control signal in a standard communications mode and a loopback testing mode in the same way as previously described for the optical loopback 100 of FIG. 1. Accordingly, this operation of the optical loopback 402 will not be described in detail. The embodiment of FIG. 4 illustrates in more detail typical components contained in each of the optical receiver 406 and optical transmitter 408. In this example embodiment, the optical receiver 406 includes a demultiplexer 406A that multiplexes the multiple wavelengths contained in the ROS/TOS signal received from the optical loopback 402. A photodetector (PD) 406B receives the demultiplexed optical signals from the demultiplexer 406A and converts the signals into electrical signals, which are then supplied to a demodulator 406C that demodulates these electrical signals to provide received electrical data signals DRX containing the data being communicated.

The optical transmitter 408 includes a plurality of lasers 408A-1 to 408A-N, each laser generating an optical signal having a particular wavelength $\lambda$. A modulator 408B receives electrical transmission data signals DTX and utilizes these data signals to modulate, such as through pulse amplitude modulation, each of the optical signals from the lasers 408A-1 to 408A-N. A multiplexer 408C receives the modulated optical signals from the modulator 408B and multiplexes these optical signals to generate a wavelength division multiplexed optical signal corresponding to transmitted optical signal TOS. The transmitted optical signal TOS is fed back to the optical receiver 406 through the optical loopback 402 during loopback testing mode of operation. During the standard communications mode of operation, received optical signals ROS on an input node 404A of the optical port 404 are supplied through the optical loopback 402 to the optical receiver 406 while the transmitted optical signal TOS from the optical transmitter 408 is supplied to an output node 404B of the optical port for transmission over an optical link coupled to the optical port.

Figure 5:
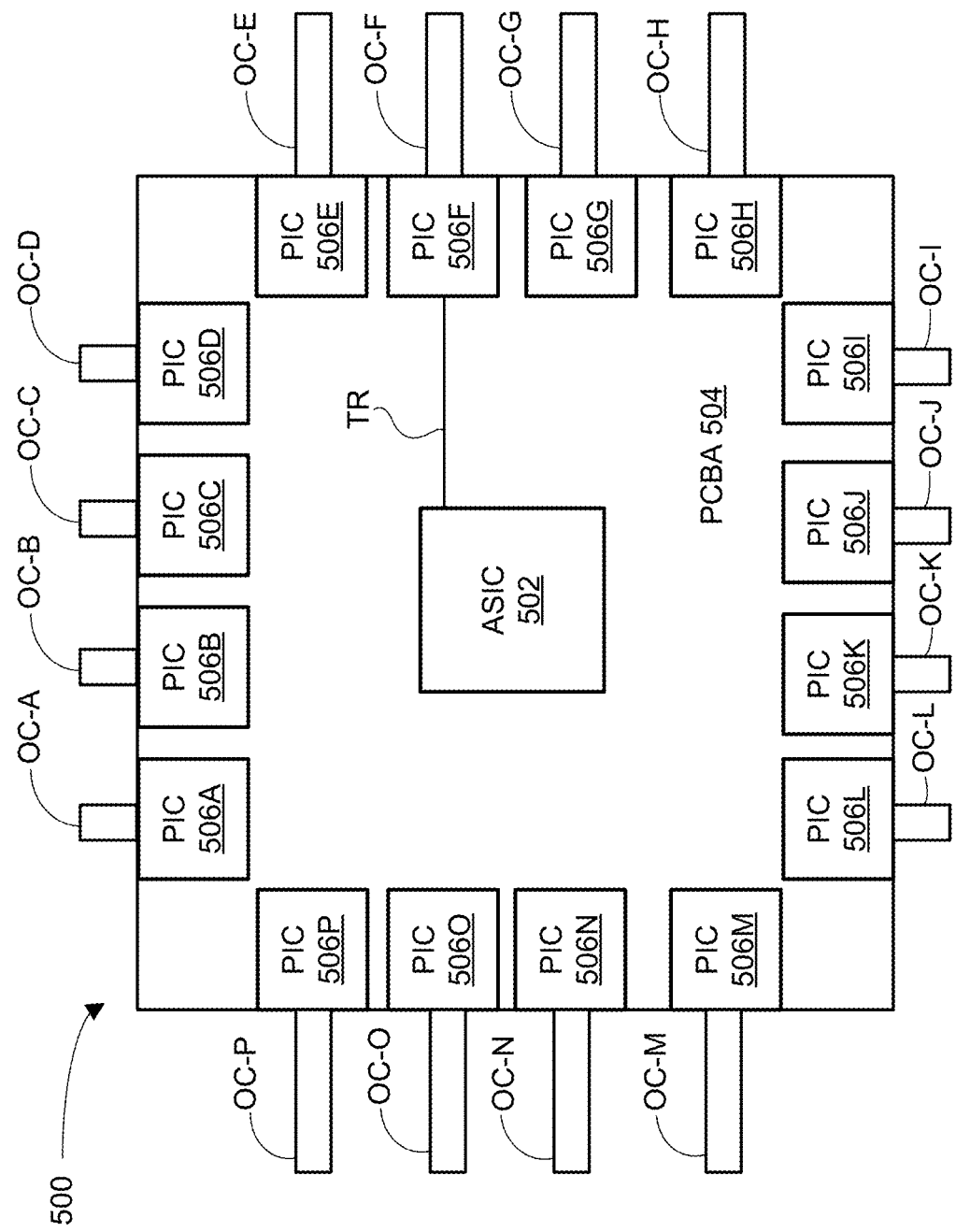
FIG. 5 is a co-packaged optics module for a network switch or other network device including a plurality of photonic integrated circuits according to another embodiment of the present disclosure.

FIG. 5 is a co-packaged optics (CPO) module 500 for a network switch or other network device including a plurality of photonic integrated circuits (PICs) 506A-P according to another embodiment of the present disclosure. As previously mentioned, CPO refers to the coupling of optics components with electrical integrated circuits such as an application specific integrated circuit (ASIC) in one package. The CPO module 500 includes an ASIC 502 mounted on an interior of a suitable substrate such as a printed circuit board assembly (PCBA) 504 with the plurality of PICs 506A-P mounted around a periphery of the PCBA. The ASIC 502 includes circuitry to perform data plane switching functions, for example, where the CPO module 500 is contained in a network switch. The ASIC 502 is electrically coupled to each of the PICs 506A-P through electrical traces of the PCBA 504, one such electrical trace TR being illustrated in FIG. 5 between the ASIC and the PIC 506F. In the CPO module 500 there are four PICs 506 positioned along each edge of the PCBA 504 by way of example. The CPO module 500 may include more or fewer PICs 506 and the arrangement of these PICs on the PCBA may vary in different embodiments. Each PIC 506A-P includes a corresponding optical coupler OC-A to OC-P that couples an optical port of the PIC to an optical connector (not shown) of the network switch or other device containing the CPO module 500. One skilled in the art will understand suitable optical connectors for the optical couplers OC-A to OC-P to optically couple the port of each PIC 506A-P to a corresponding optical interface or connector on a front plate of a network switch including the CPO module 500.

Figure 6:
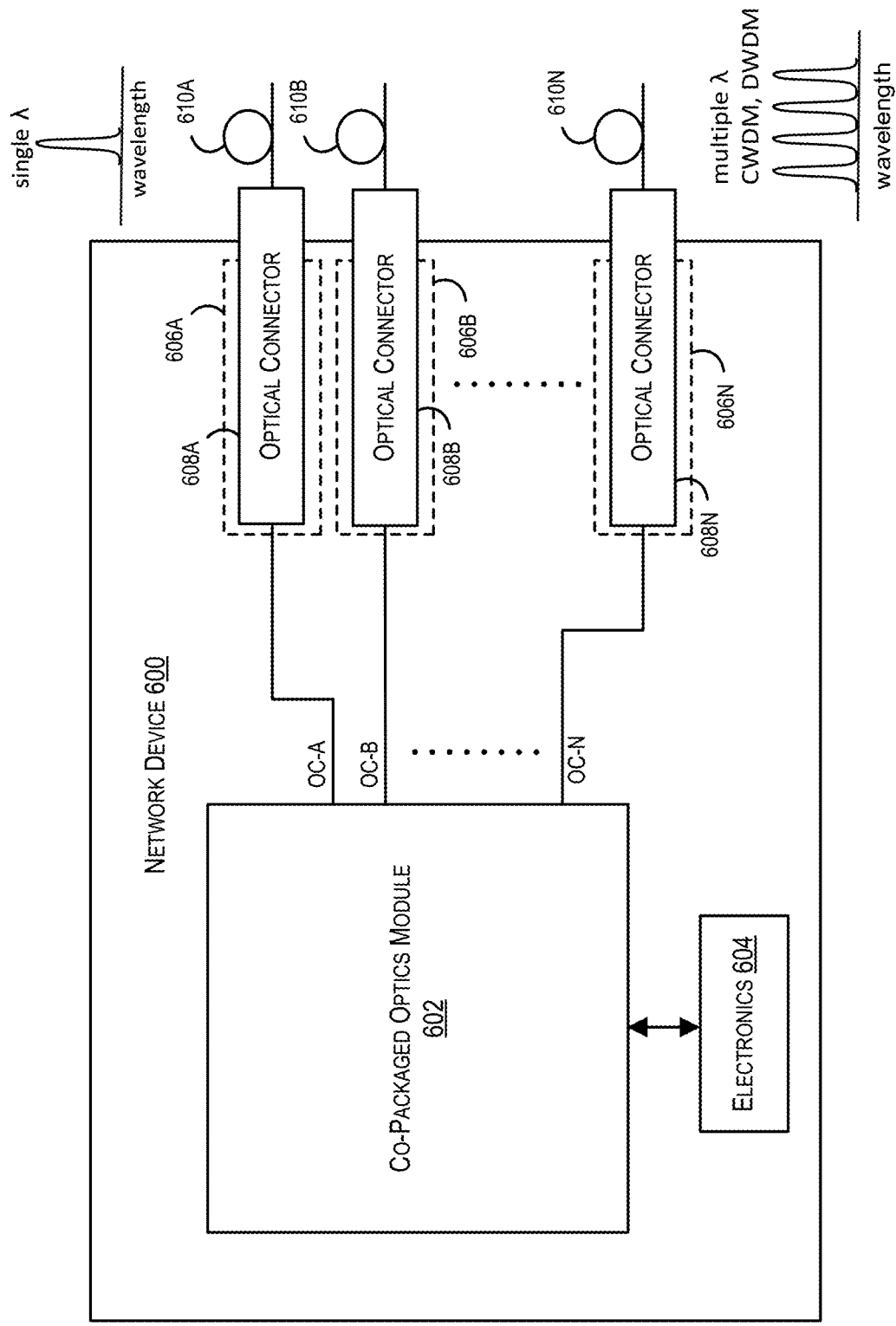
FIG. 6 is a block diagram of a network device including a co-packaged optics module according to another embodiment of the present disclosure.

FIG. 6 is a block diagram of a network device 600 including a co-packaged optics (CPO) module 602 according to another embodiment of the present disclosure. The CPO 602 corresponds to the CPO module 500 of FIG. 5 in one embodiment. The network device 600 further includes additional electronic circuitry or electronics 604 coupled to the CPO module 602. The additional electronics 604 may be contained on additional PCBAs in the network device 600. For example, where the network device 600 is a network switch the additional electronics 604 would include electronic circuitry, such as an integrated circuit including a processor, for performing control plane functionality of the network switch. The CPO module 602 includes a plurality of PICs (not shown) as previously described for the CPO module 500 of FIG. 5. Each PIC is coupled through a corresponding optical coupling OC-A to OC-N to a respective optical interface or socket 606A-N of a chassis of the network device 600. The optical sockets 606A-N may, for example, be positioned on a front plate of the chassis of the network device 600. Each optical socket 606A-N is configured to receive a pluggable optical connector 608A-N that is coupled to an optical link 610A-N such as a fiber optic cable.

The specific characteristics of optical signals communicated over the optical links 610A-N to and from the CPO module 602 may vary among the optical links. For example, the optical signal on some optical links 610A-N may include a single wavelength $\lambda$ as illustrated for the optical link 610A. Alternatively, the optical signal on some optical links 610A-N may be a coarse wavelength division multiplexing (CWDM) signal or a dense wavelength division multiplexing (DWDM) signal including multiple wavelengths $\lambda$ as illustrated for the optical link 610N in FIG. 6.

In embodiments of the network device 600, the electronics 604 includes suitable circuitry configured to execute software instructions, such as a processor, to generate the first and second mode control signals and thereby control the operation of the optical port of each PIC (not shown) in the CPO module 602 in either the communications mode or the loopback testing mode of operation. For example, the electronics 604 would generate for each PIC and the associated optical loopback the mode control signals MCS1, MCS2 as described with reference to the embodiments of FIGS. 2 and 3 to control the associated optical port in either the standard communications or loopback testing mode of operation. The network device 600 may, for example, operate in a testing mode during manufacture of the device and in this testing mode the electronics 604 generate the first and second mode control signals MCS1, MCS2 to place each optical port in the loopback testing mode of operation and thereby test the optical transmitter and optical receiver of each optical port of the CPO module 602.

FURTHER EXAMPLES

In various embodiments, the present disclosure includes systems, methods, and apparatuses for optical communications.

In one embodiment, a photonic integrated circuit comprises: an optical transmitter; an optical receiver; and an optical loopback, the optical loopback coupled to the optical transmitter and to the optical receiver and configurable to provide in a communications mode a transmitted optical signal from the optical transmitter to an optical output node and to provide a received optical signal on an optical input node to the optical receiver, and further configurable in a loopback testing mode to optically isolate the received optical signal on the optical input node from the optical receiver and to provide the transmitted optical signal from the optical transmitter to the optical receiver.

In another embodiment of the photonic integrated circuit, the optical loopback comprises: a first variable optical attenuator coupled between the optical output node and the optical receiver, the first variable optical attenuator configurable to optically isolate the optical output node from the optical receiver or to optically couple the optical output node to the optical receiver in response to a first mode control signal; and a second variable optical attenuator coupled between the optical input node and the optical receiver, the second variable optical attenuator configurable to optically isolate the optical input node and the optical receiver or to optically couple the input node to the optical receiver in response to a second mode control signal.

In another embodiment of the photonic integrated circuit, each of the first and second variable optical attenuators attenuates a signal by at least 40 dB when configured in a mode to optically isolate.

In another embodiment of the photonic integrated circuit, the optical transmitter comprises a Mach-Zehnder Modulator.

In another embodiment of the photonic integrated circuit, the Mach-Zehnder Modulator includes first and second input ports and third and fourth output ports, and wherein the optical loopback further comprises: a first variable optical attenuator coupled between the third output port and the optical receiver; and a second variable optical attenuator coupled between the optical input node and the optical receiver.

In another embodiment of the photonic integrated circuit, the optical receiver comprises an input coupled to a receiving node, and wherein the optical loopback further comprises a photodetector tap coupled to the receiving node to generate a signal indicating a power of an optical signal on the receiving node.

In another embodiment of the photonic integrated circuit, the photonic integrated circuit comprises one of an indium phosphide (InP) and a silicon photonic (SiP) integrated circuit.

In a further embodiment, a co-packaged optics device, comprises: an application specific circuit (ASIC) on a substrate, the ASIC including circuitry to perform data plane switching functions; and a plurality of photonic integrated circuits on the substrate, each of the plurality of photonic integrated circuits electrically coupled to the ASIC and each of the plurality of the photonic integrated circuits includes: an optical transmitter; an optical receiver; and an optical loopback coupled to the optical transmitter and to the optical receiver and configurable to provide in a communications mode the transmitted optical signal from the optical transmitter to an optical output node of an optical port and to provide a received optical signal on an optical input node of the optical port to the optical receiver, and further configurable in a loopback testing mode to optically isolate the received optical signal on the optical input node from the optical receiver and to provide the transmitted optical signal from the optical transmitter to the optical receiver.

In another embodiment of the co-packaged optics device, each of the plurality of photonic integrated circuit is coupled through electrical traces in the substrate to the ASIC.

In another embodiment of the co-packaged optics device, the optical loopback comprises: a first variable optical attenuator coupled between the optical output node and the optical receiver, the first variable optical attenuator configurable to optically isolate the optical output node from the optical receiver or to optically couple the optical output node to the optical receiver in response to a first mode control signal; and a second variable optical attenuator coupled between the optical input node and the optical receiver, the second variable optical attenuator configurable to optically isolate the optical input node and the optical receiver or to optically couple the input node to the optical receiver in response to a second mode control signal.

In another embodiment of the co-packaged optics device, each of the first and second variable optical attenuators attenuates a signal by at least 40 dB when configured in a mode to optically isolate.

In another embodiment of the co-packaged optics device, the optical transmitter comprises a Mach-Zehnder Modulator.

In another embodiment of the co-packaged optics device, the Mach-Zehnder Modulator includes first and second input ports and third and fourth output ports, and wherein the optical loopback further comprises: a first variable optical attenuator coupled between the third output port and the optical receiver; and a second variable optical attenuator coupled between the optical input node and the optical receiver.

In another embodiment of the co-packaged optics device, each photonic integrated circuit comprises one of an indium phosphide (InP) and a silicon photonic (SiP) integrated circuit.

In a further embodiment, a network device, comprises: electronic circuitry to perform control plane functions; a co-packaged optics module coupled to the electronic circuitry, the co-packaged optics module including: an application specific integrated circuit (ASIC) on a substrate, the ASIC including circuitry to perform data plane switching functions; and a plurality of photonic integrated circuits on the substrate, each of the plurality of photonic integrated circuits electrically coupled to the ASIC and each of the plurality of the photonic integrated circuits including: an optical transmitter; an optical receiver; and an optical loopback coupled to the optical transmitter and to the optical receiver and configurable to provide in a communications mode the transmitted optical signal from the optical transmitter to an optical output node of an optical port and to provide a received optical signal on an optical input node of the optical port to the optical receiver, and further configurable in a loopback testing mode to optically isolate the received optical signal on the optical input node from the optical receiver and to provide the transmitted optical signal from the optical transmitter to the optical receiver.

In a further embodiment of the network device, the optical loopback comprises: a first variable optical attenuator coupled between the optical output node and the optical receiver, the first variable optical attenuator configurable to optically isolate the optical output node from the optical receiver or to optically couple the optical output node to the optical receiver in response to a first mode control signal; and a second variable optical attenuator coupled between the optical input node and the optical receiver, the second variable optical attenuator configurable to optically isolate the optical input node and the optical receiver or to optically couple the input node to the optical receiver in response to a second mode control signal.

In a further embodiment of the network device, the electronic circuitry further includes circuitry to generate the first and second mode control signals and thereby control each optical port in the communications mode or the loopback testing mode of operation.

In a further embodiment of the network device, the electronic circuitry generates the first and second mode control signals to place each optical port in the loopback testing mode of operation during a testing mode of operation of the network device.

In a further embodiment of the network device, each of the plurality of photonic integrated circuits is coupled through electrical traces in the substrate to the ASIC.

In a further embodiment of the network device, the optical transmitter comprises a Mach-Zehnder Modulator.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A network device, comprising:
   electronic circuitry to perform control plane functions;
   a co-packaged optics module coupled to the electronic circuitry, the co-packaged optics module including:
   an application specific integrated circuit (ASIC) on a substrate, the ASIC including circuitry to perform data plane switching functions; and
   a plurality of photonic integrated circuits on the substrate, each of the plurality of photonic integrated circuits electrically coupled to the ASIC and each of the plurality of the photonic integrated circuits including:
   an optical transmitter comprising a Mach-Zehnder Modulator comprising a first output node and a second output node, wherein an output of the second output node is complementary to an output of the first output node;
   an optical receiver; and
   an optical loopback coupled to the optical transmitter and to the optical receiver and configurable to provide in a communications mode a transmitted optical signal from the first output node to an optical output node of an optical port and to provide a received optical signal on an optical input node of the optical port to the optical receiver, and further configurable in a loopback testing mode to optically isolate the received optical signal on the optical input node from the optical receiver and to provide the transmitted optical signal from the second output node to the optical receiver, wherein:
   the electronic circuitry further includes circuitry to generate first and second mode control signals and thereby control each optical port in the communications mode or the loopback testing mode of operation, and
   the electronic circuitry generates the first and second mode control signals to place each optical port in the loopback testing mode of operation during a testing mode of operation of the network device.

2. The network device of claim 1, wherein the optical receiver comprises an input coupled to a receiving node, and wherein the optical loopback further comprises a photodetector tap coupled to the receiving node to generate a signal indicating a power of an optical signal on the receiving node.

3. The network device of claim 1, wherein the photonic integrated circuit comprises one of an indium phosphide (InP) and a silicon photonic (SiP) integrated circuit.

4. The network device of claim 1, wherein the optical loopback comprises:
   a first variable optical attenuator coupled between the optical output node and the optical transmitter, the first variable optical attenuator configurable to optically isolate the optical output node from the optical receiver or to optically couple the optical output node to the optical receiver in response to a first mode control signal; and
   a second variable optical attenuator coupled between the optical input node and the optical receiver, the second variable optical attenuator configurable to optically isolate the optical input node and the optical receiver or to optically couple the input node to the optical receiver in response to a second mode control signal.

5. The network device of claim 4, wherein each of the first and second variable optical attenuators attenuates a signal by at least 40 dB when configured in a mode to optically isolate.

6. The network device of claim 1, wherein each of the plurality of photonic integrated circuits is coupled through electrical traces in the substrate to the ASIC.

7. A method comprising:
   generating in a network device, using electronic circuitry, first and second mode control signals to place an optical loopback, for each photonic integrated circuit of a plurality of photonic integrated circuits, in a loopback testing mode,
   wherein each of the plurality of photonic integrated circuits is electrically coupled to an ASIC capable of performing switching functions and each of the plurality of the photonic integrated circuits includes:
   an optical transmitter comprising a Mach-Zehnder Modulator comprising an input node, and a first output node and a second output node, wherein an output of the second output node is complementary to an output of the first output node;
   an optical receiver; and
   the optical loopback coupled to the optical transmitter and to the optical receiver and configurable to provide in a communications mode a transmitted optical signal from the first output node to an optical output node of an optical port and to provide a received optical signal on an optical input node of the optical port to the optical receiver, and further configurable in a loopback testing mode to optically isolate the received optical signal on the optical input node from the optical receiver and to provide the transmitted optical signal from the second output node to the optical receiver;
   transmitting at least one laser input signal into the input node of each Mach-Zehnder Modulator of the plurality of photonic integrated circuits;
   modulating each of the at least one laser input signals to generate test optical signals at the output of each Mach-Zehnder Modulator of the plurality of photonic integrated circuits; and receiving at the corresponding optical receiver of each photonic integrated circuit, the test optical signals for each of the plurality of photonic integrated circuits via the optical loopback of the photonic integrated circuit.

8. The method of claim 7, wherein a first variable optical attenuator is coupled between the optical output node and the optical receiver, the first variable optical attenuator configurable to optically isolate the optical output node from the optical receiver or to optically couple the optical output node to the optical receiver in response to a first mode control signal; and a second variable optical attenuator is coupled between the optical input node and the optical receiver, the second variable optical attenuator configurable to optically isolate the optical input node and the optical receiver or to optically couple the input node to the optical receiver in response to a second mode control signal.

9. The method of claim 8 wherein each of the first and second variable optical attenuators attenuates a signal by at least 40 dB when configured in a mode to optically isolate.

10. The method of claim 7 wherein the photonic integrated circuit comprises one of an indium phosphide (InP) and a silicon photonic (SiP) integrated circuit.

11. The method of claim 7 wherein the optical receiver comprises an input coupled to a receiving node, and wherein the optical loopback further comprises a photodetector tap coupled to the receiving node to generate a signal indicating a power of an optical signal on the receiving node.

* * * * *